UNITED STATES PATENT OFFICE.

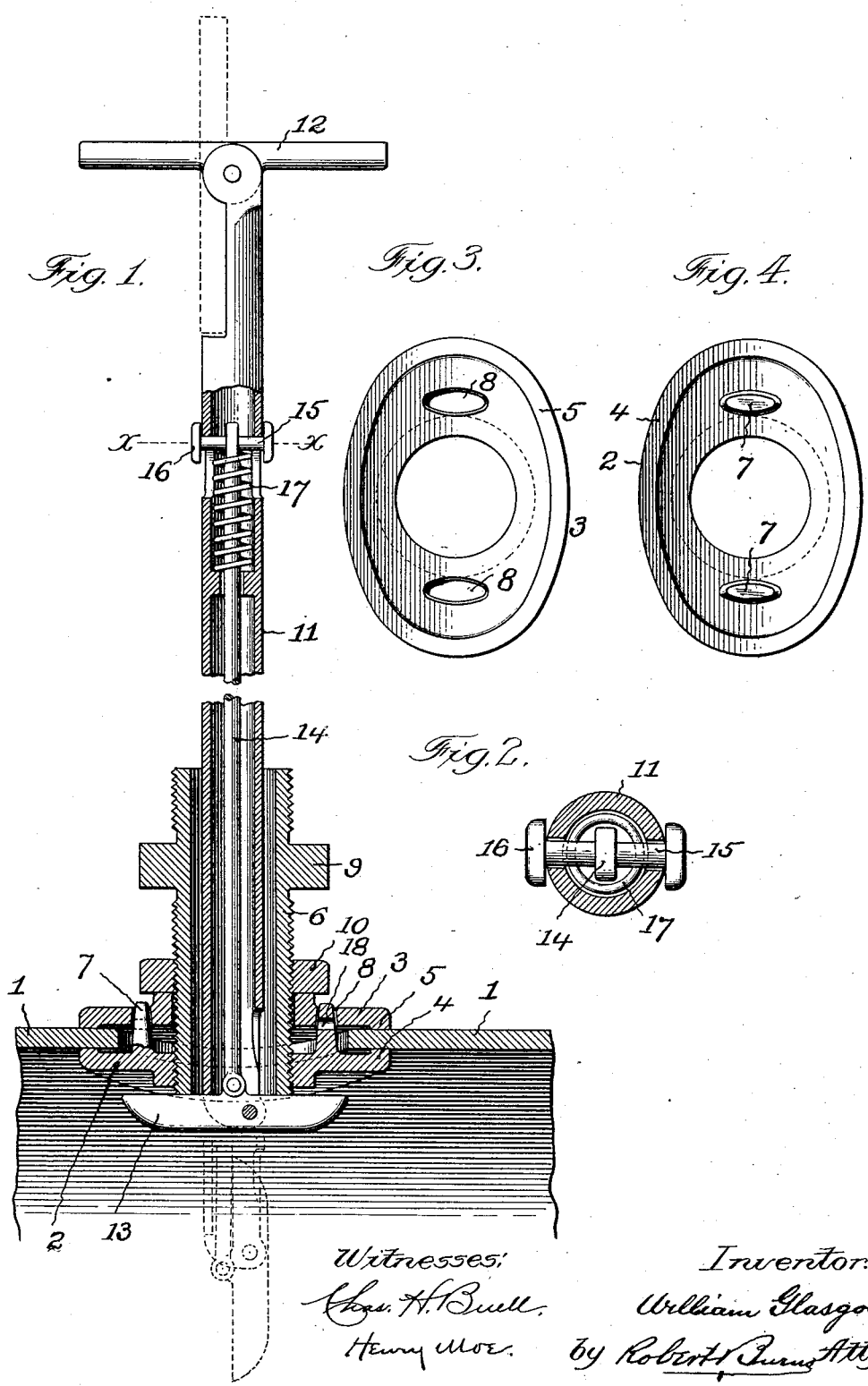

WILLIAM GLASGOW, OF ONTARIO, CALIFORNIA.

PIPE-COUPLING.

1,012,073.  Specification of Letters Patent.  Patented Dec. 19, 1911.

Application filed May 3, 1911. Serial No. 624,791.

*To all whom it may concern:*

Be it known that I, WILLIAM GLASGOW, a citizen of the United States of America, and a resident of Ontario, in the county of San Bernardino, State of California, have invented certain new and useful Improvements in Pipe-Couplings, of which the following is a specification.

This invention relates to means for coupling branch pipes to wrought metal water mains and the like, and has for its object to provide a simple and efficient structural formation and combination of parts whereby the members of the coupling are held in place and in proper relation, in a ready and convenient manner, during the operation of securing said members together upon the shell of the water main or other like object, all as will hereinafter more fully appear.

In the accompanying drawings: Figure 1, is a central sectional elevation of the coupling and means whereby the coupling members are held in proper relation during the initial coupling operation. Fig. 2, is an enlarged detail transverse section on line $x$—$x$, Fig. 1. Figs. 3 and 4, are detail elevations of the opposed faces of the respective outer and inner members of the coupling.

Similar numerals of reference indicate like parts in the several views.

Referring to the drawings, 1 represents a portion of the wrought metal water main or other like object to which a branch connection is to be made.

2 is the inner member, and 3 the outer and substantially counterpart member of the present coupling. Said members are adapted to interlock together in the manner hereinafter described, through an approximately oval orifice formed in the wall of the main 1, and their opposed surfaces are curved to fit said wall and are preferably formed with marginal bearing flanges 4 and 5, as shown.

The inner member 2, is formed with a central orifice which is screw-threaded for engagement with the screw-threaded shank of the hereinafter described connecting sleeve or nipple 6, while the outer coupling member 3, is formed with a central orifice, which is plain, and permits a free independent movement of the member upon the aforesaid shank of the nipple 6, in the operation of clamping the parts together.

7 are spurs arranged at opposite sides of the central orifice of the inner coupling member 2, and inside the marginal flange 4 thereof, while 8 are orifices formed at opposite sides of the central orifice of the outer member 3, and inside the marginal flange 5 thereof. Said orifices 8 are in alinement with the aforesaid spurs 7 of the inner member, and are adapted to receive said spurs to hold the two members from independent rotation during the coupling operation of the parts.

The connecting sleeve or nipple 6, above referred to, is formed with external screw-threads at its opposite ends, and with an intermediate non-circular operating hub 9, as shown.

10, is a lock-nut screwing upon the inner screw-threaded portion of the sleeve or nipple 6, and adapted in its turning adjustment to force the outer coupling member 3, into contact with the outer surface of the water main 1 in the coupling operation.

11 is an elongated anchor shank or stem, preferably of the hollow or tubular form shown, and provided at its upper end with a pivoted cross piece 12, which when moved into right-angle relation to the stem 11, constitutes a handle for convenient holding and manipulation of the stem and the parts carried thereby as hereinafter set forth.

13 is an anchor piece pivoted at the other end of the anchor stem 11, and adapted to assume a right angle relation to said stem, to form a support for the coupling members and sleeve 2, 3 and 6 heretofore described, in the initial operation of connecting the same together upon the main 1 aforesaid.

14 is an operating rod arranged in parallel relation to the anchor stem 11, and pivotally connected at one end to the anchor piece 13 adjacent to the pivot axis thereof. At its other end said operating rod is connected to a transverse operating slide 15 arranged to have a limited movement in the anchor stem 11, and with its respective ends provided preferably with projecting buttons 16 for convenient manual operation of the slide and rod aforesaid.

17 is a spring engaging the operating slide 15 and the upper end of the operating rod 14, and tending to hold the anchor piece 13 in its normal transverse position illustrated in full lines in Fig. 1.

18 is a transverse orifice in one or both of the spurs 7 of the inner coupling member 2, for the reception of a supporting wire or cord used as an auxiliary support in making a joint or coupling of the present parts.

In making a branch connection to a water main with the present invention, the inner coupling member 2, supported upon the anchor stem 11 and anchor piece 13, is passed into the interior of the water main 1, through a previously formed oval or oblong opening in the same, after which said inner coupling member is drawn up and held to place inside said main by the aforesaid anchor parts. The outer coupling member 3 and the connecting nipple 6 are then placed upon the anchor stem 11, and in so doing the handle or cross piece 12 is turned to the position shown in dotted lines in Fig. 1, to permit such placing of the parts. The connecting nipple 6 is then pushed through the central orifice of the outer coupling member 3, and its end screwed into the screw-threaded central orifice of the inner coupling member 2, after which the lock nut 10 is screwed along the sleeve or nipple 6 to firmly clamp the two coupling members 2 and 3 against the respective inner and outer borders of the opening in the water main 1. The operator then pushes the operating rod 14 downward against the stress of the spring 17, to turn the anchor piece 13 into the position shown in dotted lines in Fig. 1, and permit the easy removal of the anchor stem and its parts for subsequent use.

Having thus fully described my said invention what I claim as new and desire to secure by Letters Patent, is:—

In a branch coupling for water mains and the like, the combination of an inner coupling member formed with a marginal bearing flange, a central screw-threaded orifice and a plurality of spurs intermediate of said opening and marginal flange, an outer coupling member formed with a marginal bearing flange, a central orifice and a plurality of orifices corresponding to the spurs aforesaid and adapted for engagement therewith, a screw-threaded nipple passing through the outer coupling member and screwing into the inner coupling member, a lock nut screwing upon the nipple to draw the coupling members toward each other, and means for holding the parts together for assemblage, substantially as set forth.

Signed at Ontario, California, this 26th day of April 1911.

WILLIAM GLASGOW.

Witnesses:
G. W. RAND,
W. H. LINDLEY.

Copies of this patent may be obtained for five cents each, by addressing the "Commissioner of Patents, Washington, D. C."